United States Patent
Hari et al.

(10) Patent No.: US 12,301,445 B2
(45) Date of Patent: May 13, 2025

(54) STATELESS AND SECURE PACKET FORWARDING

(71) Applicant: NOKIA SOLUTIONS AND NETWORKS OY, Espoo (FI)

(72) Inventors: Adiseshu Hari, Holmdel, NJ (US); Gordon Wilfong, Portland, OR (US); Tv Lakshman, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 466 days.

(21) Appl. No.: 17/669,509

(22) Filed: Feb. 11, 2022

(65) Prior Publication Data

US 2023/0261969 A1    Aug. 17, 2023

(51) Int. Cl.
*H04L 45/16* (2022.01)
*H04L 9/40* (2022.01)
*H04L 12/18* (2006.01)
*H04L 45/00* (2022.01)
(Continued)

(52) U.S. Cl.
CPC .............. *H04L 45/16* (2013.01); *H04L 12/18* (2013.01); *H04L 45/566* (2013.01); *H04L 45/74* (2013.01); *H04L 63/0236* (2013.01); *H04L 69/22* (2013.01)

(58) Field of Classification Search
CPC ......... H04L 45/00; H04L 45/16; H04L 12/16; H04L 12/18; H04L 45/74; H04L 45/742; H04L 45/745; H04L 63/02; H04L 63/0227; H04L 63/0236; H04L 45/56;
(Continued)

(56) References Cited

U.S. PATENT DOCUMENTS 9,992,108 B2    6/2018  Hari et al.
11,374,848 B2 *  6/2022  Retana ................... H04L 45/50
(Continued)

FOREIGN PATENT DOCUMENTS

EP         3138262 A1 *  3/2017  ........... H04L 12/185
WO    WO-03039076 A1 *  5/2003  ............ H04L 12/18

OTHER PUBLICATIONS

Wijnands, et al., "Multicast Using Bit Index Explicit Replication (BIER)," Internet Engineering Task Force (IETF), RFC 8279, Nov. 2017, 43 pages.

*Primary Examiner* — Warner Wong
(74) *Attorney, Agent, or Firm* — Tong, Rea, Bentley & Kim, LLC

(57) ABSTRACT

Various example embodiments for supporting multicast are presented herein. Various example embodiments for supporting stateless multicast may be configured to support stateless multicasting of packets based on encoding of multicast path information within the packets. Various example embodiments for supporting stateless multicasting of packets based on encoding of multicast path information within the packets may be configured to use a recursive scheme of encoding the multicast path information within the packets such that the header that arrives at each node of the multicast path informs the node of the outgoing links over which the packet is to be sent and the headers to be sent on the outgoing links (e.g., each node of the multicast tree is able to recognize each of its outgoing links from the received header and send the appropriate subtree encoding down each of its outgoing links).

13 Claims, 7 Drawing Sheets

(51) Int. Cl.
*H04L 45/74* (2022.01)
*H04L 69/22* (2022.01)

(58) Field of Classification Search
CPC ....... H04L 45/566; H04L 69/00; H04L 69/22; H04L 65/611; H04L 2012/5652
See application file for complete search history.

(56) References Cited

U.S. PATENT DOCUMENTS

| | | | |
|---|---|---|---|
| 2003/0053457 A1* | 3/2003 | Fox | H04L 45/16 370/392 |
| 2010/0050256 A1* | 2/2010 | Knapp | G06F 21/552 370/252 |
| 2016/0028625 A1* | 1/2016 | Hari | H04L 45/74 370/392 |
| 2020/0119991 A1* | 4/2020 | Dutta | H04L 45/745 |
| 2021/0014174 A1* | 1/2021 | Xia | H04L 12/4633 |
| 2021/0306167 A1* | 9/2021 | Dutta | H04L 45/16 |
| 2022/0052939 A1* | 2/2022 | Dutta | H04L 45/16 |
| 2023/0121236 A1* | 4/2023 | Chen | H04L 45/50 370/390 |

\* cited by examiner

STATELESS AND SECURE PACKET FORWARDING

TECHNICAL FIELD

Various example embodiments relate generally to communication systems and, more particularly but not exclusively, to communications systems supporting multicasting of packets.

BACKGROUND

In communication systems, various communication capabilities may be configured to support various types of communications.

SUMMARY

In at least some example embodiments, an apparatus includes at least one processor and at least one memory including computer program code, wherein the at least one memory and the computer program code are configured to, with the at least one processor, cause the apparatus to at least receive, by a node, a packet having an encoded multicast header associated therewith, wherein the encoded multicast header includes, for a link over which the packet is to be transmitted by the node, a link tuple including a link identifier of the link and a link header configured for forwarding of the packet downstream of the link and support, by the node based on the encoded multicast header, communication of the packet over the link. In at least some example embodiments, the link tuple is encoded using a bit string having an initial portion that encodes the link identifier of the link and a remaining portion that encodes the link header configured for forwarding of the packet downstream of the link. In at least some example embodiments, the link header configured for forwarding of the packet downstream of the link is configured for forwarding of the packet from a downstream node that is downstream of the link to a set of destination nodes for which the packet is intended that are reachable via the downstream node that is downstream of the link. In at least some example embodiments, the link header configured for forwarding of the packet downstream of the link includes, for each downstream link that is downstream of the link and over which the packet is to be forwarded, a respective tuple including a respective link identifier of the downstream link and a respective link header configured for forwarding of the packet downstream of the downstream link. In at least some example embodiments, the link header configured for forwarding of the packet downstream of the link includes a second link tuple associated with a second link over which the packet is to be forwarded, wherein the second link tuple includes a second link identifier of the second link and a second link header configured for forwarding of the packet downstream of the second link. In at least some example embodiments, the encoded multicast header includes a pointer prepended to the link tuple. In at least some example embodiments, the pointer is set in a manner for indicating that the link tuple is the only link tuple included in the packet for the node. In at least some example embodiments, the pointer is set in a manner for indicating that the link tuple is a final link tuple of a set of link tuples included in the packet for the node. In at least some example embodiments, the pointer is set in a manner for identifying a location, within the encoded multicast header, of a second pointer associated with a second link tuple associated with a second link over which the packet is to be forwarded by the node. In at least some example embodiments, the second link tuple includes a second link identifier of the second link and a second link header configured for forwarding of the packet downstream of the second link. In at least some example embodiments, the at least one memory and the computer program code are configured to, with the at least one processor, cause the apparatus at least to transmit, by the node over the second link based on the encoded multicast header, the packet. In at least some example embodiments, the encoded multicast header includes a second link tuple associated with a second link over which the packet is to be forwarded by the node and a pointer prepended to the second link tuple. In at least some example embodiments, the pointer is sent in a manner for indicating a location, within the encoded multicast header, of the link tuple for the link. In at least some example embodiments, to support communication of the packet over the link, the at least one memory and the computer program code are configured to, with the at least one processor, cause the apparatus at least to identify, by the node from the encoded multicast header, the link header configured for forwarding of the packet downstream of the link, associate, by the node with the packet in place of the encoded multicast header, a new encoded multicast header including the link header configured for forwarding of the packet downstream of the link, and transmit, by the node over the link, the packet and the new encoded multicast header associated with the packet. In at least some example embodiments, to identify the link header configured for forwarding of the packet downstream of the link, the at least one memory and the computer program code are configured to, with the at least one processor, cause the apparatus at least to identify, within the link tuple based on an identifier of the link known to the node, the link identifier and identify, from the link tuple based on identification of the link identifier, the link header configured for forwarding of the packet downstream of the link. In at least some example embodiments, the encoded multicast header includes a global pointer indicative of a location of the link tuple within the encoded multicast header, and, to support communication of the packet over the link, the at least one memory and the computer program code are configured to, with the at least one processor, cause the apparatus at least to identify, by the node from the encoded multicast header based on the global pointer, the link header configured for forwarding of the packet downstream of the link, update, by the node, the global pointer to point to a location of the link header configured for forwarding of the packet downstream of the link, and transmit, by the node over the link, the packet and the encoded multicast header associated with the packet. In at least some example embodiments, to identify the link header configured for forwarding of the packet downstream of the link, the at least one memory and the computer program code are configured to, with the at least one processor, cause the apparatus at least to identify, within the encoded multicast header based on the global pointer, the location of the link tuple within the encoded multicast header, identify, within the link tuple based on an identifier of the link known to the node, the link identifier, and identify, from the link tuple based on identification of the link identifier, the link header configured for forwarding of the packet downstream of the link.

In at least some example embodiments, a non-transitory computer-readable medium stores computer program code configured to cause an apparatus to receive, by a node, a packet having an encoded multicast header associated therewith, wherein the encoded multicast header includes, for a link over which the packet is to be transmitted by the node, a link tuple including a link identifier of the link and a link header configured for forwarding of the packet downstream of the link and support, by the node based on the encoded multicast header, communication of the packet over the link. In at least some example embodiments, the link tuple is encoded using a bit string having an initial portion that encodes the link identifier of the link and a remaining portion that encodes the link header configured for forwarding of the packet downstream of the link. In at least some example embodiments, the link header configured for forwarding of the packet downstream of the link is configured for forwarding of the packet from a downstream node that is downstream of the link to a set of destination nodes for which the packet is intended that are reachable via the downstream node that is downstream of the link. In at least some example embodiments, the link header configured for forwarding of the packet downstream of the link includes, for each downstream link that is downstream of the link and over which the packet is to be forwarded, a respective tuple including a respective link identifier of the downstream link and a respective link header configured for forwarding of the packet downstream of the downstream link. In at least some example embodiments, the link header configured for forwarding of the packet downstream of the link includes a second link tuple associated with a second link over which the packet is to be forwarded, wherein the second link tuple includes a second link identifier of the second link and a second link header configured for forwarding of the packet downstream of the second link. In at least some example embodiments, the encoded multicast header includes a pointer prepended to the link tuple. In at least some example embodiments, the pointer is set in a manner for indicating that the link tuple is the only link tuple included in the packet for the node. In at least some example embodiments, the pointer is set in a manner for indicating that the link tuple is a final link tuple of a set of link tuples included in the packet for the node. In at least some example embodiments, the pointer is set in a manner for identifying a location, within the encoded multicast header, of a second pointer associated with a second link tuple associated with a second link over which the packet is to be forwarded by the node. In at least some example embodiments, the second link tuple includes a second link identifier of the second link and a second link header configured for forwarding of the packet downstream of the second link. In at least some example embodiments, the computer program code is configured to cause the apparatus at least to transmit, by the node over the second link based on the encoded multicast header, the packet. In at least some example embodiments, the encoded multicast header includes a second link tuple associated with a second link over which the packet is to be forwarded by the node and a pointer prepended to the second link tuple. In at least some example embodiments, the pointer is sent in a manner for indicating a location, within the encoded multicast header, of the link tuple for the link. In at least some example embodiments, to support communication of the packet over the link, the computer program code is configured to cause the apparatus at least to identify, by the node from the encoded multicast header, the link header configured for forwarding of the packet downstream of the link, associate, by the node with the packet in place of the encoded multicast header, a new encoded multicast header including the link header configured for forwarding of the packet downstream of the link, and transmit, by the node over the link, the packet and the new encoded multicast header associated with the packet. In at least some example embodiments, to identify the link header configured for forwarding of the packet downstream of the link, the computer program code is configured to cause the apparatus at least to identify, within the link tuple based on an identifier of the link known to the node, the link identifier and identify, from the link tuple based on identification of the link identifier, the link header configured for forwarding of the packet downstream of the link. In at least some example embodiments, the encoded multicast header includes a global pointer indicative of a location of the link tuple within the encoded multicast header, and, to support communication of the packet over the link, the computer program code is configured to cause the apparatus at least to identify, by the node from the encoded multicast header based on the global pointer, the link header configured for forwarding of the packet downstream of the link, update, by the node, the global pointer to point to a location of the link header configured for forwarding of the packet downstream of the link, and transmit, by the node over the link, the packet and the encoded multicast header associated with the packet. In at least some example embodiments, to identify the link header configured for forwarding of the packet downstream of the link, the computer program code is configured to cause the apparatus at least to identify, within the encoded multicast header based on the global pointer, the location of the link tuple within the encoded multicast header, identify, within the link tuple based on an identifier of the link known to the node, the link identifier, and identify, from the link tuple based on identification of the link identifier, the link header configured for forwarding of the packet downstream of the link.

In at least some example embodiments, a method includes receiving, by a node, a packet having an encoded multicast header associated therewith, wherein the encoded multicast header includes, for a link over which the packet is to be transmitted by the node, a link tuple including a link identifier of the link and a link header configured for forwarding of the packet downstream of the link and supporting, by the node based on the encoded multicast header, communication of the packet over the link. In at least some example embodiments, the link tuple is encoded using a bit string having an initial portion that encodes the link identifier of the link and a remaining portion that encodes the link header configured for forwarding of the packet downstream of the link. In at least some example embodiments, the link header configured for forwarding of the packet downstream of the link is configured for forwarding of the packet from a downstream node that is downstream of the link to a set of destination nodes for which the packet is intended that are reachable via the downstream node that is downstream of the link. In at least some example embodiments, the link header configured for forwarding of the packet downstream of the link includes, for each downstream link that is downstream of the link and over which the packet is to be forwarded, a respective tuple including a respective link identifier of the downstream link and a respective link header configured for forwarding of the packet downstream of the downstream link. In at least some example embodiments, the link header configured for forwarding of the packet downstream of the link includes a second link tuple associated with a second link over which the packet is to be forwarded, wherein the second link tuple includes a second link identifier of the second link and a second link header configured for forwarding of the packet downstream of the second link. In at least some example embodiments, the encoded multicast header includes a pointer prepended to the link tuple. In at least some example embodiments, the pointer is set in a manner for indicating that the link tuple is the only link tuple included in the packet for the node. In at least some example embodiments, the pointer is set in a manner for indicating that the link tuple is a final link tuple of a set of link tuples included in the packet for the node. In at least some example embodiments, the pointer is set in a manner for identifying a location, within the encoded multicast header, of a second pointer associated with a second link tuple associated with a second link over which the packet is to be forwarded by the node. In at least some example embodiments, the second link tuple includes a second link identifier of the second link and a second link header configured for forwarding of the packet downstream of the second link. In at least some example embodiments, the method includes transmitting, by the node over the second link based on the encoded multicast header, the packet. In at least some example embodiments, the encoded multicast header includes a second link tuple associated with a second link over which the packet is to be forwarded by the node and a pointer prepended to the second link tuple. In at least some example embodiments, the pointer is sent in a manner for indicating a location, within the encoded multicast header, of the link tuple for the link. In at least some example embodiments, supporting communication of the packet over the link includes identifying, by the node from the encoded multicast header, the link header configured for forwarding of the packet downstream of the link, associating, by the node with the packet in place of the encoded multicast header, a new encoded multicast header including the link header configured for forwarding of the packet downstream of the link, and transmitting, by the node over the link, the packet and the new encoded multicast header associated with the packet. In at least some example embodiments, identifying the link header configured for forwarding of the packet downstream of the link includes identifying, within the link tuple based on an identifier of the link known to the node, the link identifier and identifying, from the link tuple based on identification of the link identifier, the link header configured for forwarding of the packet downstream of the link. In at least some example embodiments, the encoded multicast header includes a global pointer indicative of a location of the link tuple within the encoded multicast header, and supporting communication of the packet over the link includes identifying, by the node from the encoded multicast header based on the global pointer, the link header configured for forwarding of the packet downstream of the link, updating, by the node, the global pointer to point to a location of the link header configured for forwarding of the packet downstream of the link, and transmitting, by the node over the link, the packet and the encoded multicast header associated with the packet. In at least some example embodiments, identifying the link header configured for forwarding of the packet downstream of the link includes identifying, within the encoded multicast header based on the global pointer, the location of the link tuple within the encoded multicast header, identifying, within the link tuple based on an identifier of the link known to the node, the link identifier, and identifying, from the link tuple based on identification of the link identifier, the link header configured for forwarding of the packet downstream of the link.

In at least some example embodiments, an apparatus includes means for receiving, by a node, a packet having an encoded multicast header associated therewith, wherein the encoded multicast header includes, for a link over which the packet is to be transmitted by the node, a link tuple including a link identifier of the link and a link header configured for forwarding of the packet downstream of the link and means for supporting, by the node based on the encoded multicast header, communication of the packet over the link. In at least some example embodiments, the link tuple is encoded using a bit string having an initial portion that encodes the link identifier of the link and a remaining portion that encodes the link header configured for forwarding of the packet downstream of the link. In at least some example embodiments, the link header configured for forwarding of the packet downstream of the link is configured for forwarding of the packet from a downstream node that is downstream of the link to a set of destination nodes for which the packet is intended that are reachable via the downstream node that is downstream of the link. In at least some example embodiments, the link header configured for forwarding of the packet downstream of the link includes, for each downstream link that is downstream of the link and over which the packet is to be forwarded, a respective tuple including a respective link identifier of the downstream link and a respective link header configured for forwarding of the packet downstream of the downstream link. In at least some example embodiments, the link header configured for forwarding of the packet downstream of the link includes a second link tuple associated with a second link over which the packet is to be forwarded, wherein the second link tuple includes a second link identifier of the second link and a second link header configured for forwarding of the packet downstream of the second link. In at least some example embodiments, the encoded multicast header includes a pointer prepended to the link tuple. In at least some example embodiments, the pointer is set in a manner for indicating that the link tuple is the only link tuple included in the packet for the node. In at least some example embodiments, the pointer is set in a manner for indicating that the link tuple is a final link tuple of a set of link tuples included in the packet for the node. In at least some example embodiments, the pointer is set in a manner for identifying a location, within the encoded multicast header, of a second pointer associated with a second link tuple associated with a second link over which the packet is to be forwarded by the node. In at least some example embodiments, the second link tuple includes a second link identifier of the second link and a second link header configured for forwarding of the packet downstream of the second link. In at least some example embodiments, the apparatus includes means for transmitting, by the node over the second link based on the encoded multicast header, the packet. In at least some example embodiments, the encoded multicast header includes a second link tuple associated with a second link over which the packet is to be forwarded by the node and a pointer prepended to the second link tuple. In at least some example embodiments, the pointer is sent in a manner for indicating a location, within the encoded multicast header, of the link tuple for the link. In at least some example embodiments, the means for supporting communication of the packet over the link includes means for identifying, by the node from the encoded multicast header, the link header configured for forwarding of the packet downstream of the link, means for associating, by the node with the packet in place of the encoded multicast header, a new encoded multicast header including the link header configured for forwarding of the packet downstream of the link, and means for transmitting, by the node over the link, the packet and the new encoded multicast header associated with the packet. In at least some example embodiments, the means for identifying the link header configured for forwarding of the packet downstream of the link includes means for identifying, within the link tuple based on an identifier of the link known to the node, the link identifier and means for identifying, from the link tuple based on identification of the link identifier, the link header configured for forwarding of the packet downstream of the link. In at least some example embodiments, the encoded multicast header includes a global pointer indicative of a location of the link tuple within the encoded multicast header, and the means for supporting communication of the packet over the link includes means for identifying, by the node from the encoded multicast header based on the global pointer, the link header configured for forwarding of the packet downstream of the link, means for updating, by the node, the global pointer to point to a location of the link header configured for forwarding of the packet downstream of the link, and means for transmitting, by the node over the link, the packet and the encoded multicast header associated with the packet. In at least some example embodiments, the means for identifying the link header configured for forwarding of the packet downstream of the link includes means for identifying, within the encoded multicast header based on the global pointer, the location of the link tuple within the encoded multicast header, means for identifying, within the link tuple based on an identifier of the link known to the node, the link identifier, and means for identifying, from the link tuple based on identification of the link identifier, the link header configured for forwarding of the packet downstream of the link.

In at least some example embodiments, an apparatus includes at least one processor and at least one memory including computer program code, wherein the at least one memory and the computer program code are configured to, with the at least one processor, cause the apparatus to support communication of a packet having a header associated therewith, wherein the header includes a tuple associated with a link over which the packet is to be forwarded, wherein the tuple includes a link identifier of the link and a link header configured for forwarding of the packet downstream of the link. In at least some example embodiments, a non-transitory computer-readable medium stores computer program code configured to cause an apparatus to support communication of a packet having a header associated therewith, wherein the header includes a tuple associated with a link over which the packet is to be forwarded, wherein the tuple includes a link identifier of the link and a link header configured for forwarding of the packet downstream of the link. In at least some example embodiments, a method includes supporting communication of a packet having a header associated therewith, wherein the header includes a tuple associated with a link over which the packet is to be forwarded, wherein the tuple includes a link identifier of the link and a link header configured for forwarding of the packet downstream of the link. In at least some example embodiments, an apparatus includes means for supporting communication of a packet having a header associated therewith, wherein the header includes a tuple associated with a link over which the packet is to be forwarded, wherein the tuple includes a link identifier of the link and a link header configured for forwarding of the packet downstream of the link.

BRIEF DESCRIPTION OF THE DRAWINGS

The teachings herein can be readily understood by considering the following detailed description in conjunction with the accompanying drawings, in which.

To facilitate understanding, identical reference numerals have been used herein, wherever possible, in order to designate identical elements that are common among the various figures.

DETAILED DESCRIPTION

Figure 1:
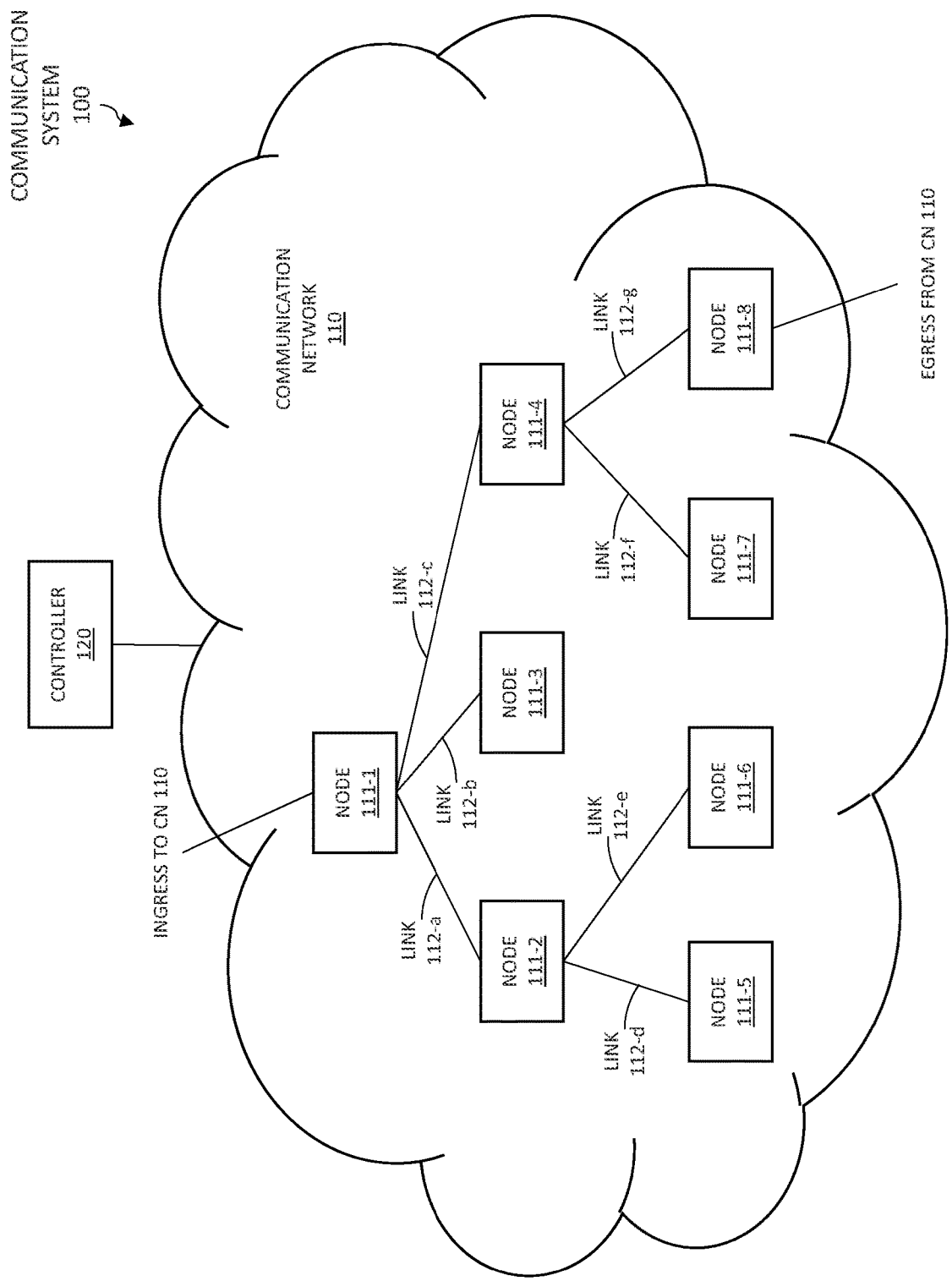
FIG. 1 depicts an example embodiment of a communication system configured to support stateless multicasting of packets.

Current multicast forwarding is typically implemented as stateful multicast. In stateful multicast, each forwarding element typically installs and maintains multicast forwarding state information in order to forward multicast packets. This is typically expensive to setup and maintain and unscalable, as each multicast flow typically needs its own multicast forwarding state information. For example, in a network supporting millions of multicast flows, there may be millions of setup requests to each forwarding element and each forwarding element will need to store millions of multicast forwarding entries. Additionally, certain stateful multicast techniques also may have security issues associated therewith (e.g., multicast state information available on nodes may be accessed and used for malicious purposes).

Various example embodiments for supporting stateless multicast are presented herein. Various example embodiments for supporting stateless multicast may be configured to support stateless multicasting of packets based on encoding of multicast path information within the packets. Various example embodiments for supporting stateless multicasting of packets based on encoding of multicast path information within the packets may be configured to use a recursive scheme of encoding the multicast path information within the packets such that the header that arrives at each node of the multicast path informs the node of the outgoing links over which the packet is to be sent and the headers to be sent on the outgoing links (e.g., each node of the multicast tree is able to recognize each of its outgoing links from the received header and send the appropriate subtree encoding down each of its outgoing links). Various example embodiments for supporting stateless multicasting of packets based on recursive multicast may be configured to support communication of a multicast packet over a multicast tree composed of a set of links based on an encoded multicast header included within the multicast packet, where the encoded multicast header includes a recursive encoding of the links of the multicast tree using link tuples for the links with each link tuple encoding a respective link identifier of the respective link and a respective link header configuring for further forwarding of the multicast packet on a subtree of the multicast tree that is downstream of the respective link.

Various example embodiments for supporting stateless multicast may be configured to provide various advantages or potential advantages. For example, various example embodiments for supporting stateless multicast may obviate the need to maintain forwarding state in the forwarding elements, thereby reducing the costs of supporting multicast and making implementation of multicast more scalable. For example, various example embodiments for supporting stateless multicast may overcome various limitations associated with certain stateful multicast schemes (e.g., eliminating various limitations of Bit Index Explicit Replication (BIER), such as limitation of multicast to a fixed number of links, lack of dynamic network reconfiguration and resizing, and so forth). For example, various example embodiments for supporting stateless multicast may be configured to provide a more secure multicast implementation (e.g., a node cannot directly sent a packet to other nodes, since a node does not have the capability of creating the encoded multicast header, as the link numbering of each node in the network and the layout of the network is not publicly available).

It will be appreciated that these and various other example embodiments and advantages or potential advantages of supporting stateless multicasting of packets may be further understood by way of reference to the various figures, which are discussed further below.

FIG. 1 depicts an example embodiment of a communication system configured to support stateless multicasting of packets.

In FIG. 1, the communication system 100 includes a communication network 110 and a controller 120. The communication network 110 includes a set of nodes 111-1-111-8 (collectively, nodes 111 which also may be referred to and labeled as nodes "1" through "8", respectively) and a set of links 112-a-112-g (collectively, links 112 which also may be referred to and labeled as links "a" through "g", respectively). The nodes 111 may include any suitable types of communication elements, such as routers, switches, or the like. The links 112 may include any suitable types of communication links which may support communications between the nodes 111. The links 112 may be identified using link identifiers which are unique per node 111. The links 112 may be identified using link identifiers that are bit strings (e.g., if "a" and "b" are links 112 of a single node 111 then "a" and "b" are unique bit strings, whereas if "a" and "b" are links 112 of different nodes 111 then "a" and "b" do not need to be (although they could be) unique bit strings since the links 112 are associated with different nodes 111). It will be appreciated that, although primarily presented with respect to specific numbers, types, and arrangements of elements (e.g., nodes 111 and links 112), the communication network 110 may include various other numbers, types, and/or arrangements of elements. The controller 120 is configured to provide control functions for the communication network 110.

The communication network 110 is arranged to support multicast of packets. The node 111-1 is associated with an ingress link (denoted as ingress to CN 110) over which multicast packets may be received at the CN 110 and three outgoing links 112 (illustratively, link 112-a to node 111-2, link 112-b to node 111-3, and link 112-c to node 111-4, respectively) over which multicast packets may be sent by the node 111-1. The node 111-2 is associated with an incoming link 112-a over which multicast packets may be received and two outgoing links 112 (illustratively, link 112-d to node 111-5 and link 112-e to node 111-6) over which multicast packets may be sent by the node 111-2. The node 111-3 is associated with an incoming link 112-b over which multicast packets may be received and may be associated with one or more outgoing links over which multicast packets may be sent by the node 111-3 (although such link(s) have been omitted for purposes of clarity). The node 111-4 is associated with an incoming link 112-c over which multicast packets may be received and two outgoing links 112 (illustratively, link 112-f to node 111-7 and link 112-g to node 111-8) over which multicast packets may be sent by the node 111-4. The node 111-5 is associated with an incoming link 112-d over which multicast packets may be received and may be associated with one or more outgoing links over which multicast packets may be sent by the node 111-5 (although such link(s) have been omitted for purposes of clarity). The node 111-6 is associated with an incoming link 112-e over which multicast packets may be received and may be associated with one or more outgoing links over which multicast packets may be sent by the node 111-6 (although such link(s) have been omitted for purposes of clarity). The node 111-7 is associated with an incoming link 112-f over which multicast packets may be received and may be associated with one or more outgoing links over which multicast packets may be sent by the node 111-7 (although such link(s) have been omitted for purposes of clarity). The node 111-8 is associated with an incoming link 112-g over which multicast packets may be received and may be associated with one or more outgoing links over which multicast packets may be sent by the node 111-8 (although such link(s) have been omitted for purposes of clarity). It will be appreciated that the communication network 110 may be organized in various other topologies.

The communication network 110 is arranged to support multicast of packets. The multicast of packets may be performed for a multicast group having a set of intended receivers. The multicast of packets for a multicast group may be performed by supporting forwarding of the multicast packets over a multicast tree to reach the intended receivers of the multicast group. The multicast tree includes the set of nodes 111 and links 112 over which multicast packets of the multicast group are to be sent to reach the intended receivers of the multicast groups. The multicast of packets for a multicast group may be performed by associating, with each multicast packet to be sent over the multicast tree for the multicast group, an encoded multicast header having encoded therein information which describes the multicast tree, such that forwarding of the multicast packets over the multicast tree may be performed by the nodes 111 based on the encoded multicast header without a need for use of state information maintained at the nodes 111. The encoded multicast header which is associated with multicast packets for a multicast group may be associated with the multicast packets by including the encoded header within the multicast packets, prepending the multicast header to the multicast packets, and so forth. The multicast packets for a multicast group, which are forwarded over the multicast tree for the multicast group, may include any suitable type of packets which may be multicast for a multicast group (e.g., Multiprotocol Label Switching (MPLS) packets, Internet Protocol (IP) packets, or the like, as well as various combinations thereof).

The communication network 110 is arranged to support multicast of packets based on recursive multicast techniques. In various example embodiments of recursive multicast, an encoded multicast header for a multicast group is associated with multicast packets of the multicast group to be sent over the multicast tree for the multicast group. The multicast tree for the multicast group is composed of a set of links 112 over which multicast packets are to be sent. The encoded multicast header encodes the multicast tree based on encoding of the links 112 of the multicast tree using a set of link tuples, denoted as <link, link header> tuples, where the "link" of the link tuple <link, link header> specifies the link 112 over which multicast packets are to be sent and the "link header" of the link tuple <link, link header> specifies the encoding of the sub-tree of the multicast tree rooted at the node downstream of the "link" of the link tuple <link, link header> (which itself may be composed of zero or more link tuples depending on a number of links downstream of the node which are part of the multicast tree for the multicast group). This results in a recursive encoding of the multicast tree in which each "link header" of a link tuple may be composed of zero or more link tuples for zero or more links of the multicast tree downstream of the "link" specified in the link tuple (in other words, encoding of link tuples within link tuples for recursive encoding of the multicast tree within the headers of the multicast packets in a stateless manner). It will be appreciated that the use of recursive multicast techniques to support multicast may be further understood by way of the following example described within the context of the communication network 110 of FIG. 1.

In this example, assume that the multicast tree within the communication network 110 includes links 112-*a,* 112-*c,* 112-*d,* 112-*e,* and 112-*g*. In this example, assume that a multicast packet is received by node 111-1 from outside of the communication network 110. It will be appreciated that the multicast packet that is received at the node 111-1 from outside of the communication network 110 may be encoded and injected into the communication network 110 in various ways. The encoded multicast header of the multicast packet received at node 111-1 is <a, X, c, Y>, which tells the node 111-1 that the outgoing links for the packet are links 112-*a* and 112-*c* and that the encoded multicast headers to be sent on links 112-*a* and 112-*c* are X and Y, respectively. The node 111-1 sends the multicast packet over link 112-*a* with the encoded multicast header <X> where the encoded multicast header is <d, L, e, M>. The node 111-1 sends the multicast packet over link 112-*c* with the encoded multicast header <Y> where the encoded multicast header is <g,N>. The encoded multicast header of the multicast packet received at node 111-2 is <d, L, e, M>, which tells the node 111-2 that the outgoing links for the packet are links 112-*d* and 112-*e* and that the encoded multicast headers to be sent on links 112-*d* and 112-*e* are L and M, respectively. The node 111-2 sends the multicast packet over link 112-*d* with the encoded multicast header <L> where the encoded multicast header is configured to support forwarding of the multicast packet over any links of the multicast tree that are downstream of link 112-*d*. The node 111-2 sends the multicast packet over link 112-*e* with the encoded multicast header <M> where the encoded multicast header is configured to support forwarding of the multicast packet over any links of the multicast tree that are downstream of link 112-*e*. The encoded multicast header of the multicast packet received at node 111-4 is <g,N>, which tells the node 111-4 that the outgoing link for the packet is link 112-*g* and that the encoded multicast header to be sent on link 112-*g* is <N>. The node 111-4 sends the multicast packet over link 112-*g* with the encoded multicast header <N> where the encoded multicast header is configured to support forwarding of the multicast packet over any links of the multicast tree that are downstream of link 112-*g* (which are omitted for purposes of clarity). In this manner, the multicast packet is sent over the multicast tree based on information encoded within the header of the multicast packet, without the need to use state information stored at the nodes 111.

In at least some example embodiments, the encoded multicast header of a multicast packet may be encoded as a bit string which is composed of concatenations of bit strings for <link, link header> tuples encoded within the encoded multicast header. For example, consider the encoded multicast header of the multicast packet received at node 111-1 from the example above: <a, X, c, Y>. Here, "a" is a bit string that uniquely identifies link 112-*a* at node 111-1, "X" is a bit string that encodes the multicast header to be included with the multicast packet sent over link 112-*a* by node 111-1, and the concatenation of the bit string "a" and the bit string "X" is a bit string that encodes the <link, link header> tuple for the link 112-*a*. Similarly, here, "c" is a bit string that uniquely identifies link 112-*c* at node 111-1, "Y" is a bit string that encodes the multicast header to be included with the multicast packet sent over link 112-*c* by node 111-1, and the concatenation of the bit string "c" and the bit string "Y" is a bit string that encodes the <link, link header> tuple for the link 112-*c*. In both cases, identification of the bit string for the link automatically gives the bit string for the link header (e.g., for the first tuple <a,X> the node 111-1 recognizes that bit string "a" as being the identifier for link 112-*a* such that extraction of "a" from <a,X> automatically gives X and, similarly, for the second tuple <c,Y> the node 111-1 recognizes that bit string "c" as being the identifier for link 112-*c* such that extraction of "c" from <c,Y> automatically gives Y). In this example, the concatenation of the <link, link header> tuple for the link 112-*a* (namely, <a,X>) and the <link, link header> tuple for the link 112-*c* (namely, <c,Y>) is a bit string that encodes the full set of <link, link header> tuples for the links 112 over which the node 111-1 needs to send the multicast packet and, thus, which provides all information needed by nodes 111 downstream of the node 111-1 which are part of the multicast tree for full multicast of the multicast packet over all links 112 of the multicast tree downstream of node 111-1.

In at least some example embodiments, separation between the <link, link header> tuples of the encoded multicast header may be provided using pointer fields for each of the <link, link header> tuples. For example, consider the encoded multicast header of the multicast packet received at node 111-1 from the example above: <a, X, c, Y>. Here, the first tuple <a,X> may be indicated using a first pointer as <Ptr1, a, X> and the second tuple <c,Y> may be indicated using a second pointer as <Ptr2, c, Y>, such that the encoded multicast header of the multicast packet received at node 111-1 becomes <Ptr1, a, X, Ptr2, c, Y>. The pointer Ptr1 associated with the first tuple <a,X> is configured to point to the pointer Ptr2 associated with the second tuple <c,Y>, indicating a location of the pointer Ptr2 within the encoded multicast header <Ptr1, a, X, Ptr2, c, Y> such that the node 111-1 can distinguish the first tuple <a,X> from the second tuple <c,Y> within the encoded multicast header <Ptr1, a, X, Ptr2, c, Y> even though the encoded multicast header <Ptr1, a, X, Ptr2, c, Y> is encoded as a continuous bit string. The pointer Ptr2 associated with the second tuple <c,Y> is configured to inform the node 111-1 that the second tuple is the last <link, link header> tuple in the encoded multicast header. The pointer that is used to identify the last <link, link header> tuple in the encoded multicast header may be set to a special value (e.g., zero or some other suitable value) to indicate that the associated <link, link header> tuple is the last <link, link header> tuple in the encoded multicast header. Herein, the pointer that is used to identify the last <link, link header> tuple in the encoded multicast header is primarily denoted using "Ptr0", although it will be appreciated that other notations may be used. It will be appreciated that the pointers used for demarcation of link tuples within encoded multicast headers may be encoded in various ways.

In at least some example embodiments, the encoding for the encoded multicast header may be handled in various ways as the multicast packet traverses the multicast tree. In at least some example embodiments, as presented with respect to FIG. 2 and FIG. 3, the encoded multicast header is consumed as the multicast packet is forwarded over the multicast tree (e.g., for a given link tuple associated with a link 112 over which the multicast packet is to be sent by a node 111, the encoded multicast header of the packet received at the node 111 may be replaced with the link header in the link tuple associated with the link 112 prior to transmission of the multicast packet by the node 111 over the link 112 associated with the link tuple, such that no encoded multicast header remains in the multicast packets receives at the leaves of the multicast group). In at least some example embodiments, as presented with respect to FIG. 4 and FIG. 5, the encoded multicast header is retained as the multicast packet is forwarded over the multicast tree (e.g., for a given link tuple associated with a link 112 over which the multicast packet is to be sent by a node 111, the encoded multicast header of the packet received at the node 111 may updated to include information configured to inform the downstream node 111 downstream of the link 112 as to a location within the encoded multicast header of the set of link tuples for the set of links 112 over which the downstream node 111-1 is to send the multicast packet). It will be appreciated that the handling of the encoded multicast header by nodes of the multicast tree as the multicast packet traverses the nodes 111 and links 112 of the multicast tree may be performed in various other ways.

The controller 120 is configured to provide control functions for the communication network 110. The controller 120 is configured to maintain topology information for the communication network 110. The controller 120, for a multicast flow to be communicated through the communication network 110, may be configured to compute the multicast tree for the multicast flow (e.g., the set of links 112 over which multicast packets of the multicast flow are to be communicated) based on topology information for the communication network 110, determine the encoded multicast header for the multicast flow based on the multicast tree for the multicast flow, and provide the encoded multicast header for the multicast flow to the ingress node 111 of the communication network 110 for the multicast flow for use by the ingress node 111 of the communication network 110 for the multicast flow in forwarding multicast packets of the multicast flow over the multicast tree for the multicast flow. The controller 120 may be configured to provide various other control functions configured to facilitate stateless multicast within the communication network 110.

It will be appreciated that the communication system 100, although primarily presented as supporting specific functions for supporting multicast of packets based on recursive multicast techniques, may be configured to support various other functions for supporting multicast of packets based on recursive multicast techniques.

Figure 2:
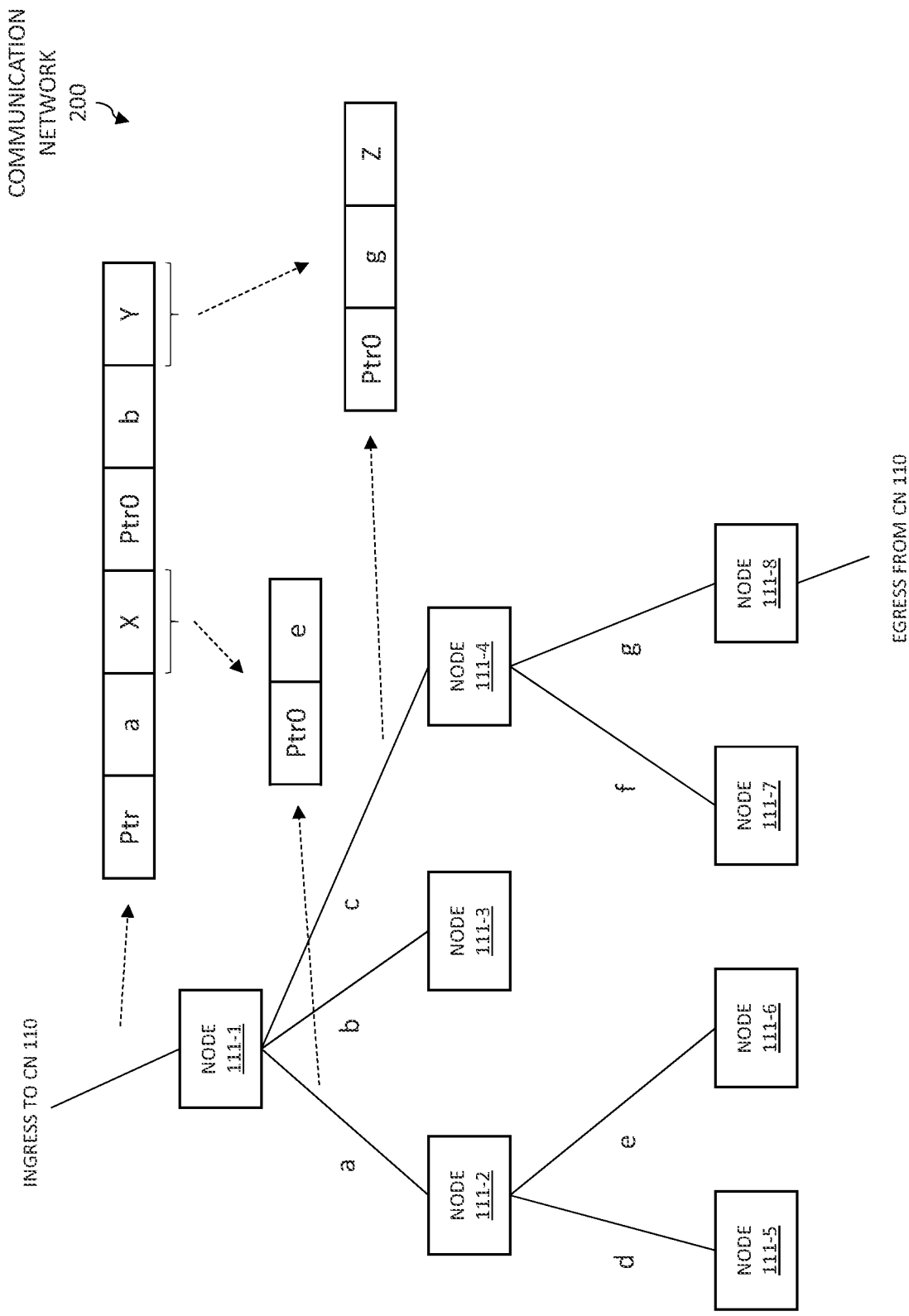
FIG. 2 depicts the communication network of FIG. 1 for illustrating an example embodiment of a first approach for recursive multicast labeling for supporting multicast within the communication network.

FIG. 2 depicts the communication network of FIG. 1 for illustrating an example embodiment of a first approach for recursive multicast labeling for supporting multicast within the communication network.

In FIG. 2, the communication network 200 is identical to the communication network 110 of the communication system 100 of FIG. 1. In the example embodiment of FIG. 2, the encoded multicast header is consumed as the multicast packet is forwarded over the multicast tree for the multicast group.

In the example of FIG. 2, a multicast packet received at node 111-1 over the ingress link to node 111-1 is to be sent over links 112-a, 112-c, 112-e, 112-g, and the link downstream of node 111-8 which egresses the communication network 200.

At node 111-1, the encoded multicast header of the multicast packet received at node 111-1 is: <Ptr, a, X, Ptr0, c, Y>, where Ptr is the pointer associated with the first tuple <a,X> for link 112-a (with <a> identifying link 112-a and <X> being the link header to be sent over link 112-a) and Ptr0 is the pointer associated with the second tuple <c,Y> for link 112-c (with <c> identifying link 112-c and <Y> being the link header to be sent over link 112-c). The pointer Ptr associated with the tuple for link 112-a points to the pointer Ptr0 associated with the tuple for link 112-c. The node 111-1 uses the pointer Ptr to identify the location of the pointer Ptr0 in the encoded multicast header. The node 111-1 uses the pointer Ptr and the pointer Ptr0 to identify the portion of the encoded multicast header that is the first tuple <a,X> for link 112-a and to identify the portion of the encoded multicast header that is the second tuple <c,Y> for link 112-c.

The node 111-1 uses the portion of the first tuple <a,X> that identifies link 112-a (namely, <a>, which is the portion of the bit string of the tuple <a,X> that matches the unique link identifier of link 112-a) to identify link 112-a and to recover the remaining portion of the tuple (namely, <X>, which is the downstream multicast header to be included with the multicast packet that is sent over link 112-a). The node 111-1 then sends the multicast packet over link 112-a to node 111-2 with the encoded multicast header <X>, which is: <Ptr0, e>. Here, Ptr0 indicates that there is only a single tuple in the encoded multicast header, and the lack of a link header associated with the link identifier of link 112-e in the tuple indicates that node 111-6 at the end of link 112-e is an endpoint node for the multicast packet (i.e., that the multicast packet is not to be sent further downstream of node 111-6 / link 112-e). The pointer Ptr and associated first tuple <a,X> for link 112-a are removed from the multicast packet and not further propagated downstream of the node 111-1 in the multicast packet sent over link 112-a and, thus, have been consumed by the node 111-1.

The node 111-1 uses the portion of the second tuple <c,Y> that identifies link 112-c (namely, <c>, which is the portion of the bit string of the tuple <c,Y> that matches the unique link identifier of link 112-c) to identify link 112-c and to recover the remaining portion of the tuple (namely, <Y>, which is the downstream multicast header to be included with the multicast packet that is sent over link 112-c). The node 111-1 then sends the multicast packet over link 112-c to node 111-4 with the encoded multicast header <Y>, which is: <Ptr0, g, Z>. Here, Ptr0 indicates that there is only a single tuple in the encoded multicast header, where the tuple <g,Z> indicates that the multicast packet is to be further forwarded over link 112-g. The pointer Ptr0 and associated second tuple <c,Y> for link 112-*c* are removed from the multicast packet and not further propagated downstream of the node 111-1 and, thus, have been consumed by the node 111-1.

At node 111-2, the encoded multicast header of the multicast packet received at node 111-2 is: <Ptr0,e>, where Ptr0 is the pointer associated with the tuple <e> for link 112-*e* (with <e> identifying link 112-*e* and the lack of a link header associated with the link identifier of link 112-*e* indicative that the multicast packet is not to be further forwarded beyond the node 111-6 associated with link 112-*e*. The node 111-2 uses the pointer Ptr0 to determine that the tuple <e> is the only tuple included in the encoded multicast header. The node 111-2 uses the pointer Ptr0 to identify the portion of the encoded multicast header that is the tuple <e> for link 112-*e*.

The node 111-2 uses the portion of the tuple <e> that identifies link 112-*e* (namely, <e>, which is the entire bit string of the tuple <e> that matches the unique link identifier of link 112-*e*) to identify link 112-*e* and to determine that there is no remaining portion of the tuple (i.e., no link header to be included with the multicast packet that is sent over link 112-*e*). The node 111-4 then sends the multicast packet over link 112-*e* to node 111-6 without any encoded multicast header (although it will be appreciated that one or more other headers may be used). The pointer Ptr0 and associated tuple <e> for link 112-*e* are removed from the multicast packet and not further propagated downstream of the node 111-4 and, thus, have been consumed by the node 111-2.

At node 111-4, the encoded multicast header of the multicast packet received at node 111-4 is: <Ptr0, g, Z>, where Ptr0 is the pointer associated with the tuple <g.Z> for link 112-*g* (with <g> identifying link 112-*g* and <Z> being the link header to be sent over link 112-*g*). The node 111-4 uses the pointer Ptr0 to determine that the tuple <g,Z> is the only tuple included in the encoded multicast header. The node 111-4 uses the pointer Ptr0 to identify the portion of the encoded multicast header that is the tuple <g,Z> for link 112-*g*.

The node 111-4 uses the portion of the tuple <g,Z> that identifies link 112-*g* (namely, <g>, which is the portion of the bit string of the tuple <g,Z> that matches the unique link identifier of link 112-*g*) to identify link 112-*g* and to recover the remaining portion of the tuple (namely, <Z>, which is the downstream multicast header to be included with the multicast packet that is sent over link 112-*g*). The node 111-4 then sends the multicast packet over link 112-*g* to node 111-8 with the link header <Z> (which, for purposes of brevity, is not further defined herein). The pointer Ptr0 and associated second tuple <g,Z> for link 112-*g* are removed from the multicast packet and not further propagated downstream of the node 111-4 and, thus, have been consumed by the node 111-4.

At node 111-8, the encoded multicast header of the multicast packet received at node 111-8 is based on the link header <Z> incorporated into the multicast packet by the node 111-4 before forwarding the multicast packet over the link 112-*g* to node 111-8. The link header <Z> may be used by the node 111-8 for forwarding the multicast packet downstream of node 111-8 (although, as indicated above, the details of such further forwarding have been omitted for purposes of brevity).

Figure 3:
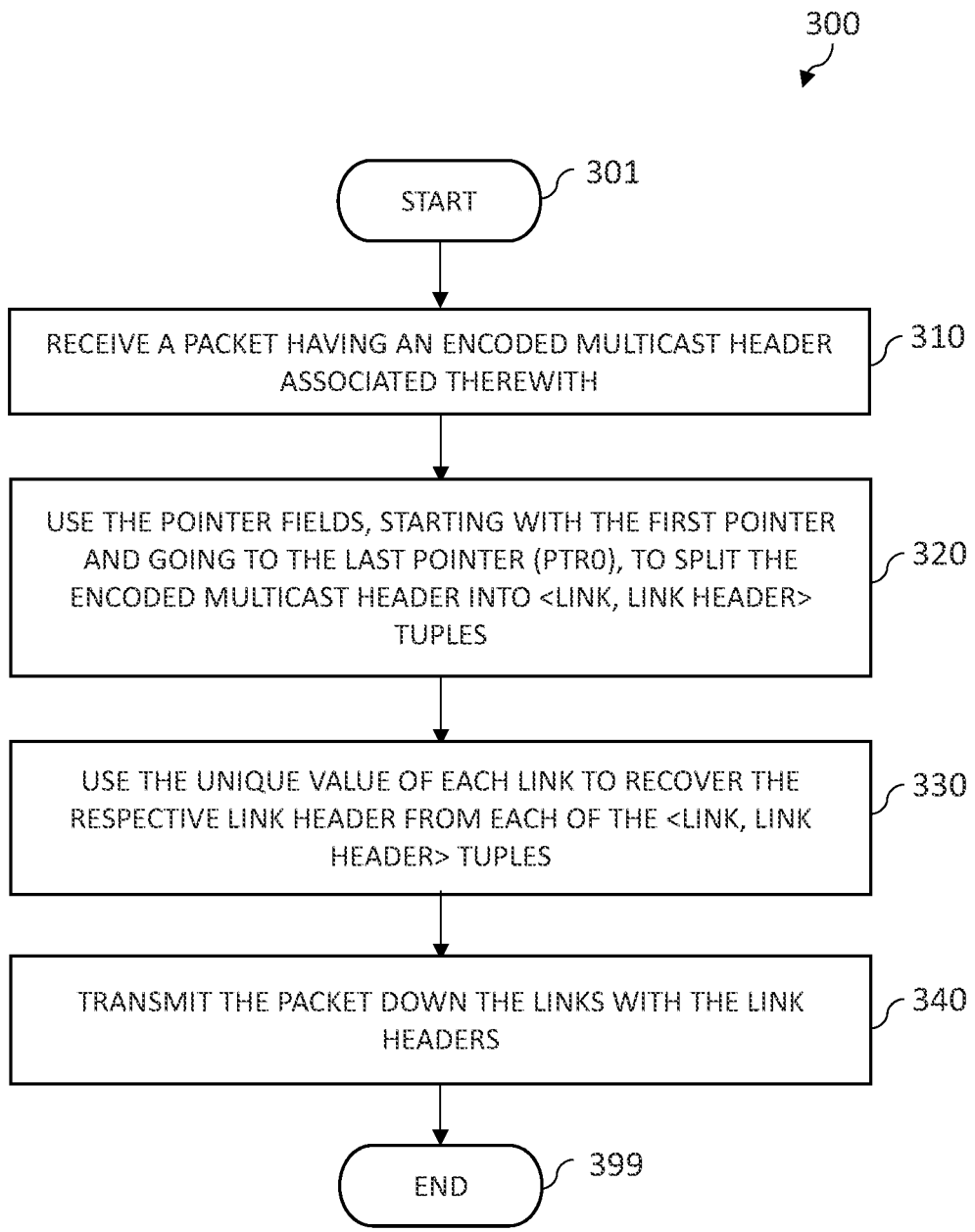
FIG. 3 depicts an example embodiment of a method for use by a node for supporting the first approach for recursive multicast labeling illustrated in FIG. 2.

It will be appreciated that the example embodiment of FIG. 2, in which the encoded multicast header is consumed as the multicast packet is forwarded over the multicast tree, may be performed using and may be further understood by way of reference to the method of FIG. 3.

FIG. 3 depicts an example embodiment of a method for use by a node for supporting the first approach for recursive multicast labeling illustrated in FIG. 2. It will be appreciated that, although primarily presented as being performed serially, at least a portion of the blocks of the method 300 may be performed contemporaneously or in a different order than as presented in FIG. 3. At block 301, the method 300 begins. At block 310, receive a packet having an encoded multicast header associated therewith. The encoded multicast header may be considered to be part of the packet or may be a header prepended to a packet being transported. At block 320, use the pointer fields, starting with the first pointer and going to the last pointer (Ptr0), to split the encoded multicast header into <link, link header> tuples. At block 330, use the unique value of each link to recover the respective link header from each of the <link, link header> tuples. At block 340, transmit the packet down the links with the link headers. At block 399, the method 300 ends. It will be appreciated that, although primarily presented with respect to embodiments in which the packet is sent over multiple links from the node, it is possible that the packet may be sent over only a single link from the node (in which case there will be a single <link, link header> tuple with pointer (Pt0)).

Figure 4:
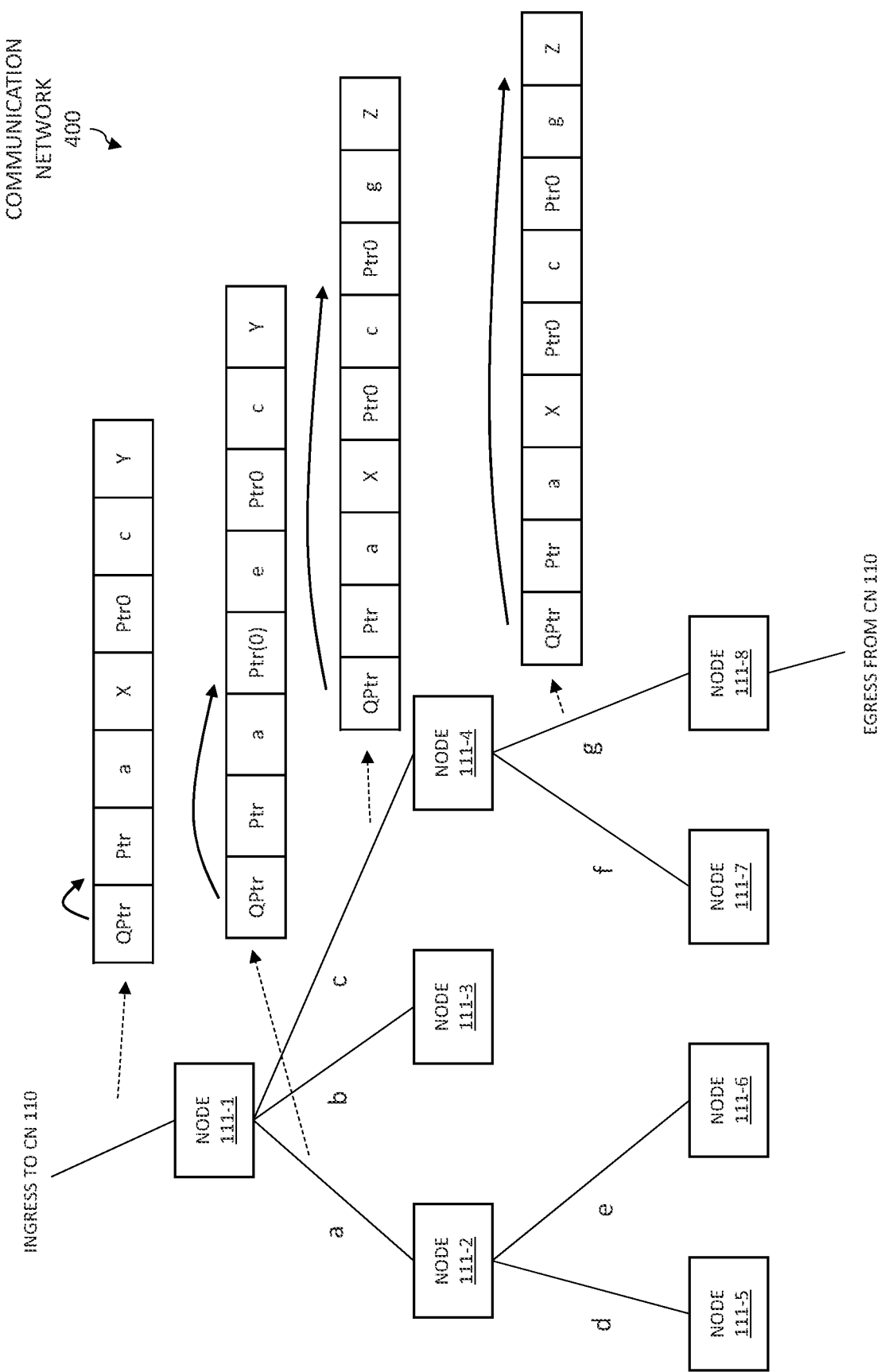
FIG. 4 depicts the communication network of FIG. 1 for illustrating an example embodiment of a second approach for recursive multicast labeling for supporting multicast within the communication network.

FIG. 4 depicts the communication network of FIG. 1 for illustrating an example embodiment of a first approach for recursive multicast labeling for supporting multicast within the communication network.

In FIG. 4, the communication network 400 is identical to the communication network 110 of the communication system 100 of FIG. 1. In the example embodiment of FIG. 4, the encoded multicast header is retained as the multicast packet is forwarded over the multicast tree for the multicast group.

In the example of FIG. 4, a multicast packet received at node 111-1 over the ingress link to node 111-1 is to be sent over links 112-*a*, 112-*c*, 112-*e*, 112-*g*, and the link downstream of node 111-8 which egresses the communication network 400.

At node 111-1, the encoded multicast header of the multicast packet received at node 111-1 is: <QPtr, Ptr, a, X, Ptr0, c, Y>, where QPtr is a global pointer for the encoded multicast header, Ptr is the pointer associated with the first tuple <a,X> for link 112-*a* (with <a> identifying link 112-*a* and <X> being the link header to be sent over link 112-*a*), and Ptr0 is the pointer associated with the second tuple <c,Y> for link 112-*c* (with <c> identifying link 112-*c* and <Y> being the link header to be sent over link 112-*c*). The global pointer QPtr points to a pointer associated with the first tuple of the encoded multicast header to be used by the node 111-1 that receives the multicast packet (in this case, pointing to the pointer Ptr associated with the first tuple <a,X> for link 112-*a*). The pointer Ptr associated with the tuple for link 112-*a* points to the pointer Ptr0 associated with the link tuple for link 112-*c*. The node 111-1 uses the global pointer QPtr to identify the location of the first pointer Ptr of the first tuple in the set of tuples of the multicast header to be used by the node 111-1 for forwarding of the multicast packet downstream of the node 111-1. The node 111-1 uses the pointer Ptr to identify the location of the pointer Ptr0 in the encoded multicast header. The node 111-1 uses the pointer Ptr and the pointer Ptr0 to identify the portion of the encoded multicast header that is the first tuple <a,X> for link 112-*a* and to identify the portion of the encoded multicast header that is the second tuple <c,Y> for link 112-*c*.

The node 111-1 uses the portion of the first tuple <a,X> that identifies link 112-*a* (namely, <a>, which is the portion of the bit string of the tuple <a,X> that matches the unique link identifier of link 112-*a*) to identify link 112-*a* and to recover the remaining portion of the tuple (namely, <X>, which is the downstream multicast header which is relevant to the multicast packet that is sent over link 112-*a*). The node 111-1 then sends the multicast packet over link 112-*a* to node 111-2 with the full encoded multicast header <QPtr, Ptr, a, Ptr0, e, Ptr0, c, Y> with the global header QPtr updated to point to the Ptr0 associated with the link header for link 112-*e* (which is the first and only link tuple in the link header for the link 112-*e*). Here, Ptr0 associated with link 112-*e* that is pointed to by the global pointer QPtr indicates that there is only a single tuple of the encoded multicast header that is of interest to node 111-4, and the lack of a link header associated with the link identifier of link 112-*e* in the tuple indicates that node 111-6 at the end of link 112-*e* is an endpoint node for the multicast packet (i.e., that the multicast packet is not to be sent further downstream of node 111-6/link 112-*e*). The pointer Ptr and associated first tuple <a,X> for link 112-*a*, although being used by the node 111-1, are retained within the encoded multicast header when the multicast packet is further propagated downstream of the node 111-1 in the multicast packet sent over link 112-*a*.

The node 111-1 uses the portion of the second tuple <c,Y> that identifies link 112-*c* (namely, <c>, which is the portion of the bit string of the tuple <c,Y> that matches the unique link identifier of link 112-*c*) to identify link 112-*c* and to recover the remaining portion of the tuple (namely, <Y>, which is the downstream multicast header which is relevant to the multicast packet that is sent over link 112-*c*). The node 111-1 then sends the multicast packet over link 112-*c* to node 111-4 with the full encoded multicast header <QPtr, Ptr, a, X, Ptr0, c, Ptr0, g, Z> with the global header QPtr updated to point to the Ptr0 associated with link header for link 112-*g* (which is the first and only link tuple in the link header for the link 112-*g*). Here, Ptr0 associated with link 112-*g* that is pointed to by the global pointer QPtr indicates that there is only a single tuple of the encoded multicast header that is of interest to node 111-8 and the tuple <g,Z> indicates that the multicast packet is to be further forwarded over link 112-*g*. The pointer Ptr and associated second tuple <c,Y> for link 112-*c*, although being used by the node 111-1, are retained within the encoded multicast header when the multicast packet is further propagated downstream of the node 111-1 in the multicast packet sent over link 112-*a*.

At node 111-2, the encoded multicast header of the multicast packet received at node 111-2 is: <QPtr, Ptr, a, Ptr0, e, Ptr0, c, Y>, where the global header QPtr points to the Ptr0 associated with link 112-*e*. The Ptr0 pointed to by the global pointer QPtr is the pointer associated with the tuple <e> for link 112-*e* (with <e> identifying link 112-*e* and the lack of a link header associated with the link identifier of link 112-*e* indicative that the multicast packet is not to be further forwarded beyond the node 111-6 associated with link 112-*e*). The node 111-2 uses the pointer Ptr0 pointed to by the global pointer QPtr to determine that the tuple <e> is the only tuple included in the encoded multicast header. The node 111-2 uses the pointer Ptr0 to identify the portion of the encoded multicast header that is the tuple <e> for link 112-*e*.

The node 111-2 uses the portion of the tuple <e> that identifies link 112-*e* (namely, <e>, which is the entire bit string of the tuple <e> that matches the unique link identifier of link 112-*e*) to identify link 112-*e* and to determine that there is no remaining portion of the tuple (i.e., no link header to be included with the multicast packet that is sent over link 112-*e*). The node 111-4 then sends the multicast packet over link 112-*e* to node 111-6 without any encoded multicast header (although it will be appreciated that one or more other headers may be used).

At node 111-4, the encoded multicast header of the multicast packet received at node 111-4 is: <QPtr, Ptr, a, X, Ptr0, c, Ptr0, g, Z>, where the global header QPtr points to the Ptr0 associated with link 112-*g*. The Ptr0 pointed to by the global pointer QPtr is the pointer associated with the tuple <g,Z> for link 112-*g* (with <g> identifying link 112-*g* and <Z> being the link header to be sent over link 112-*g*). The node 111-4 uses the pointer Ptr0 pointed to by the global pointer QPtr to determine that the tuple <g,Z> is the only tuple included in the encoded multicast header. The node 111-2 uses the pointer Ptr0 to identify the portion of the encoded multicast header that is the tuple <g,Z> for link 112-*g*.

The node 111-4 uses the portion of the tuple <g,Z> that identifies link 112-*g* (namely, <g>, which is the portion of the bit string of the tuple <g,Z> that matches the unique link identifier of link 112-*g*) to identify link 112-*g* and to recover the remaining portion of the tuple (namely, <Z>, which is the downstream multicast header to be included with the multicast packet that is sent over link 112-*g*). The node 111-4 then sends the multicast packet over link 112-*g* to node 111-8 with the full encoded multicast header <QPtr, Ptr, a, X, Ptr0, c, Ptr0, g, Z> with the global header QPtr updated to point to the pointer associated with the first tuple of the link header <Z> (which, for purposes of brevity, is not further defined herein). The pointer Ptr0 and associated tuple <g,Z> for link 112-*g*, although being used by the node 111-4, are retained within the encoded multicast header when the multicast packet is further propagated downstream of the node 111-4 in the multicast packet sent over link 112-*g*.

At node 111-8, the encoded multicast header of the multicast packet received at node 111-4 is: <QPtr, Ptr, a, X, Ptr0, c, Ptr0, g, Z>, where the global header QPtr points to the pointer of the link header <Z> (which, as indicated above, is omitted for purposes of brevity). The link header <Z> of the encoded multicast header may be used by the node 111-8 for forwarding the multicast packet downstream of node 111-8 (although, as indicated above, the details of such further forwarding have been omitted for purposes of brevity).

Figure 5:
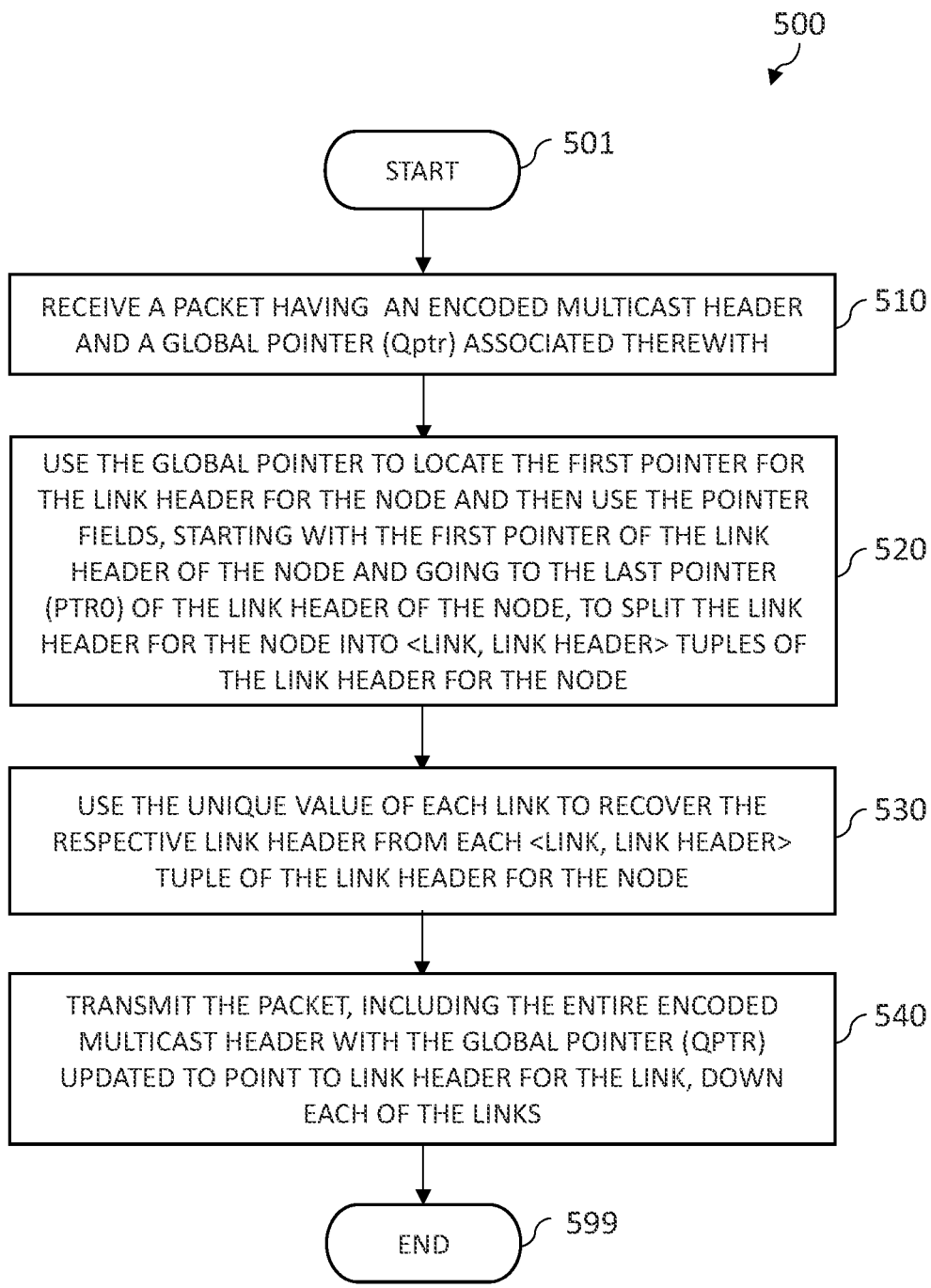
FIG. 5 depicts an example embodiment of a method for use by a node for supporting the second approach for recursive multicast labeling illustrated in FIG. 4.

It will be appreciated that the example embodiment of FIG. 4, in which the encoded multicast header is retained as the multicast packet is forwarded over the multicast tree, may be performed using and may be further understood by way of reference to the method of FIG. 5.

FIG. 5 depicts an example embodiment of a method for use by a node for supporting the second approach for recursive multicast labeling illustrated in FIG. 4. It will be appreciated that, although primarily presented as being performed serially, at least a portion of the blocks of the method 500 may be performed contemporaneously or in a different order than as presented in FIG. 5. At block 501, the method 500 begins. At block 510, receive a packet having an encoded multicast header and a global pointer (Qptr) associated therewith. The encoded multicast header and the global pointer (Qptr) may be considered to be part of the packet or may be a header prepended to a packet being transported. At block 520, use the global pointer to locate the first pointer for the link header for the node and then use the pointer fields, starting with the first pointer and going to the last pointer (Ptr0) of the link header for the node, to split the link header for the node into the <link, link header> tuples of the link header for the node. At block 530, use the unique value of each link to recover the respective link header from each of the <link, link header> tuples of the link header for the node. At block 540, transmit the packet, including the entire encoded multicast header with the global pointer (Qptr) updated to point to the link header for the link, down each of the links. At block 599, the method 500 ends. It will be appreciated that, although primarily presented with respect to embodiments in which the packet is sent over multiple links from the node, it is possible that the packet may be sent over only a single link from the node (in which case there will be a single <link, link header> tuple with pointer (Pt0)).

Figure 6:
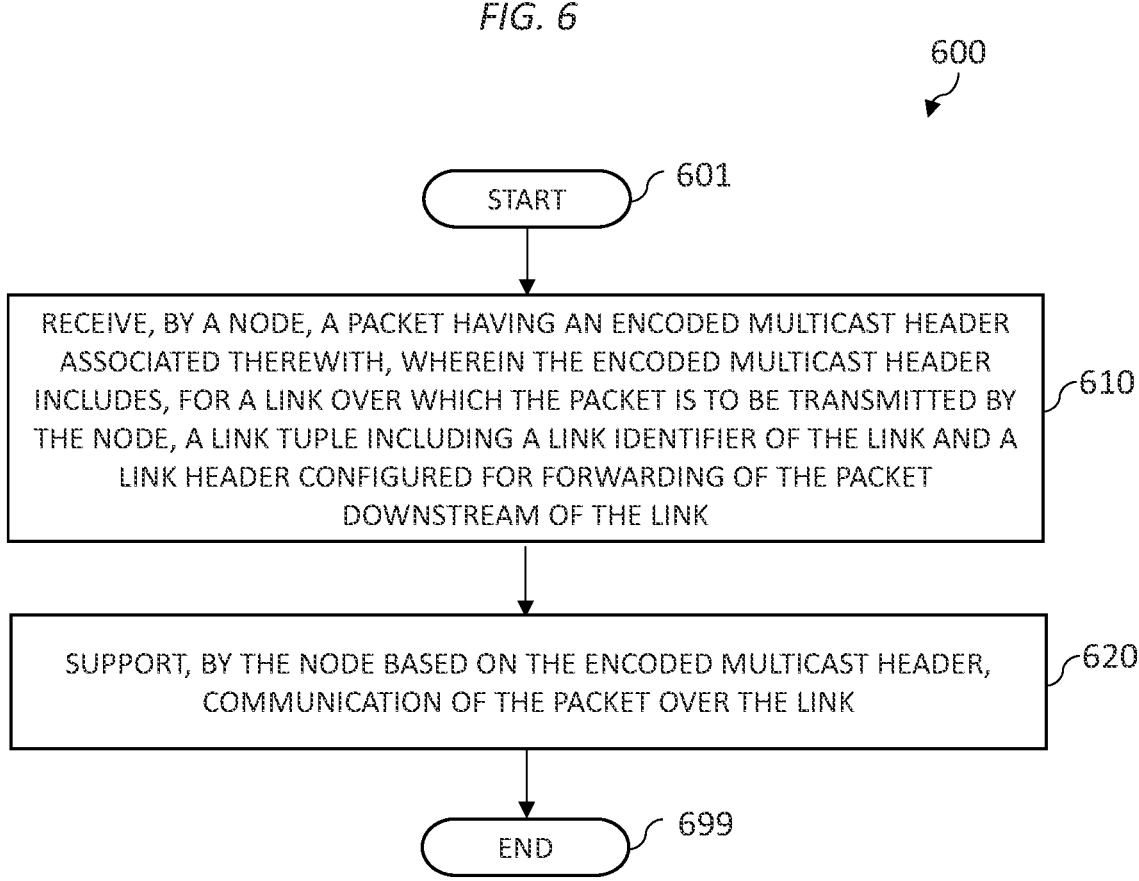
FIG. 6 depicts an example embodiment of a method for use by a node for supporting stateless multicasting of packets.

FIG. 6 depicts an example embodiment of a method for use by a node for supporting stateless multicasting of packets. At block 601, the method 600 begins. At block 610, receive, by a node, a packet having an encoded multicast header associated therewith, wherein the encoded multicast header includes, for a link over which the packet is to be transmitted by the node, a link tuple including a link identifier of the link and a link header configured for forwarding of the packet downstream of the link. At block 620, support, by the node based on the encoded multicast header, communication of the packet over the link. At block 699, the method 600 ends. In at least some example embodiments, the link tuple is encoded using a bit string having an initial portion that encodes the link identifier of the link and a remaining portion that encodes the link header configured for forwarding of the packet downstream of the link. In at least some example embodiments, the link header configured for forwarding of the packet downstream of the link is configured for forwarding of the packet from a downstream node that is downstream of the link to a set of destination nodes for which the packet is intended that are reachable via the downstream node that is downstream of the link. In at least some example embodiments, the link header configured for forwarding of the packet downstream of the link includes, for each downstream link that is downstream of the link and over which the packet is to be forwarded, a respective tuple including a respective link identifier of the downstream link and a respective link header configured for forwarding of the packet downstream of the downstream link. In at least some example embodiments, the link header configured for forwarding of the packet downstream of the link includes a second link tuple associated with a second link over which the packet is to be forwarded, wherein the second link tuple includes a second link identifier of the second link and a second link header configured for forwarding of the packet downstream of the second link. In at least some example embodiments, the encoded multicast header includes a pointer prepended to the link tuple. In at least some example embodiments, the pointer is set in a manner for indicating that the link tuple is the only link tuple included in the packet for the node. In at least some example embodiments, the pointer is set in a manner for indicating that the link tuple is a final link tuple of a set of link tuples included in the packet for the node. In at least some example embodiments, the pointer is set in a manner for identifying a location, within the encoded multicast header, of a second pointer associated with a second link tuple associated with a second link over which the packet is to be forwarded by the node. In at least some example embodiments, the second link tuple includes a second link identifier of the second link and a second link header configured for forwarding of the packet downstream of the second link. In at least some example embodiments, the method includes transmitting, by the node over the second link based on the encoded multicast header, the packet. In at least some example embodiments, the encoded multicast header includes a second link tuple associated with a second link over which the packet is to be forwarded by the node and a pointer prepended to the second link tuple. In at least some example embodiments, the pointer is sent in a manner for indicating a location, within the encoded multicast header, of the link tuple for the link. In at least some example embodiments, to support communication of the packet over the link, the method includes identifying, by the node from the encoded multicast header, the link header configured for forwarding of the packet downstream of the link, associating, by the node with the packet in place of the encoded multicast header, a new encoded multicast header including the link header configured for forwarding of the packet downstream of the link, and transmitting, by the node over the link, the packet and the new encoded multicast header associated with the packet. In at least some example embodiments, to identify the link header configured for forwarding of the packet downstream of the link, the method includes identifying, within the link tuple based on an identifier of the link known to the node, the link identifier and identifying, from the link tuple based on identification of the link identifier, the link header configured for forwarding of the packet downstream of the link. In at least some example embodiments, the encoded multicast header includes a global pointer indicative of a location of the link tuple within the encoded multicast header and, to support communication of the packet over the link, the method includes identifying, by the node from the encoded multicast header based on the global pointer, the link header configured for forwarding of the packet downstream of the link, updating, by the node, the global pointer to point to a location of the link header configured for forwarding of the packet downstream of the link, and transmitting, by the node over the link, the packet and the encoded multicast header associated with the packet. In at least some example embodiments, to identify the link header configured for forwarding of the packet downstream of the link, the method includes identifying, within the encoded multicast header based on the global pointer, the location of the link tuple within the encoded multicast header, identifying, within the link tuple based on an identifier of the link known to the node, the link identifier; and identifying, from the link tuple based on identification of the link identifier, the link header configured for forwarding of the packet downstream of the link.

Figure 7:
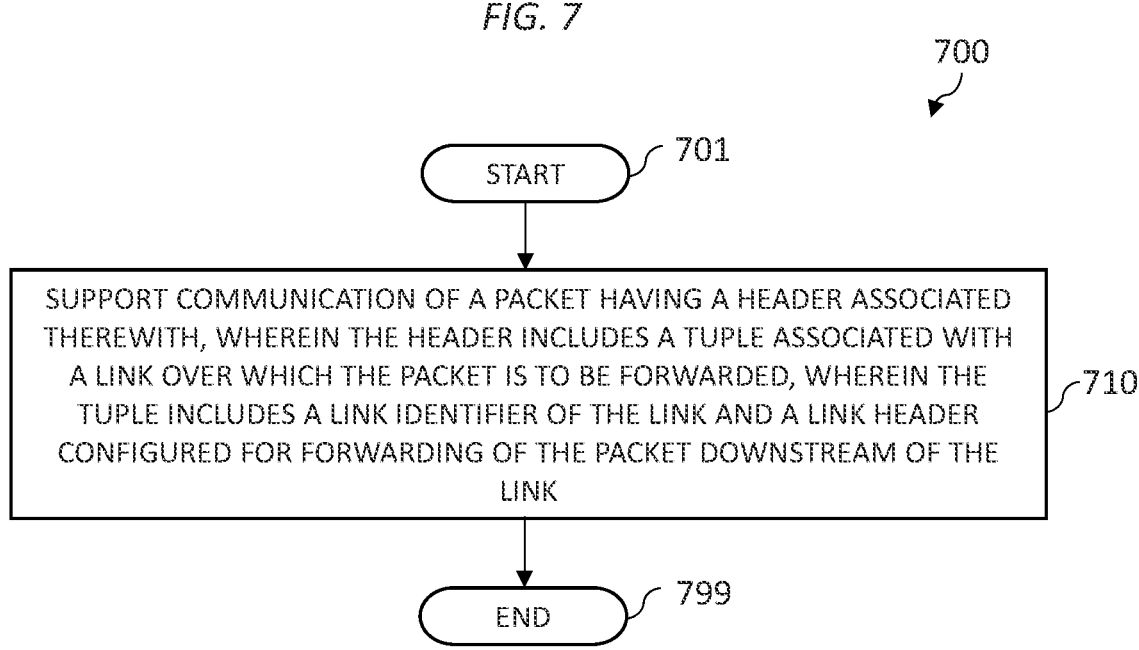
FIG. 7 depicts an example embodiment of a method for use by a node for supporting stateless multicasting of packets.

FIG. 7 depicts an example embodiment of a method for use by a node for supporting stateless multicasting of packets. At block 701, the method 700 begins. At block 710, support communication of a packet having a header associated therewith, wherein the header includes a tuple associated with a link over which the packet is to be forwarded, wherein the tuple includes a link identifier of the link and a link header configured for forwarding of the packet downstream of the link. At block 799, the method 700 ends.

Various example embodiments for supporting stateless multicast may be configured to provide various advantages or potential advantages.

For example, various example embodiments for supporting stateless multicast may be configured to support various improvements in multicast-enabled networks, including improved security, performance, scalability, reliability, cost, or the like, as well as various combinations thereof. For example, security may be improved as nodes can only send packets after receiving the encoded headers needed for packet transmission, performance may be improved as there is no need to maintain and update multicast routing tables in each network forwarding elements, scalability may be improved as there is no limitation on the number of multicast paths that can be supported by a network, and so forth.

For example, various example embodiments for supporting stateless multicast may be configured to encode the multicast path of a packet in the packet header of the packet, thereby reducing or eliminating packet forwarding state within the multicast-enabled network and, thus, supporting a secure, locked-down multicast-enabled network. For example, there are security implications in having nodes send multicast traffic arbitrarily, which generally requires use of multicast filtering at each forwarding element and may lead to additional state setup and most possible complications and race conditions, all of which may be avoided based on use of various example embodiments for supporting stateless multicast. As such, various example embodiments for stateless multicast support stateless and secure multicast.

For example, various example embodiments for supporting stateless multicast may be configured to encode the multicast path of a packet in the packet header of the packet, thereby reducing or eliminating signaling and storage of packet forwarding state within the multicast-enabled network (e.g., signaling for updating forwarding tables for each flow, maintaining tables including separate entries for each multicast flow, and so forth) and, thus, supporting improvements in scalability of the multicast-enabled network and costs of operating the multicast-enabled network. For example, problems with maintaining state are especially acute for multicast traffic, where no aggregation is possible and each multicast flow gets a separate table entry, and generally leads to non-scalable and expensive multicast as the network is generally limited in the number of multicast routing table entries supported at each node and performance bottlenecks occur when multicast flows are initiated (e.g., in terms of updating each forwarding element in the path with a new multicast routing entry before that multicast flow can be initiated), all of which may be avoided based on use of various example embodiments for supporting stateless multicast. As such, various example embodiments for stateless multicast improve scalability of multicast.

For example, various example embodiments for supporting stateless multicast may be configured to provide a trusted network plane topology. For example, various example embodiments for supporting stateless multicast may be configured to support ultra-secure military, government, and commercial networks, enabling such networks to be built and operated in a provably secure manner. For example, various example embodiments for supporting stateless multicast may be configured to use such source routed multicast techniques in order to allow a trusted network controller to validate all incoming flow requests and only setup source routed multicasts for authorized flows, thereby preventing various types of attacks which may be attempted against multicast-enabled networks (e.g., denial-of-service (DoS)/distributed DoS (DDoS) attacks or other types of attacks which may be attempted against multicast-enabled networks). As such, various example embodiments for stateless multicast provide a trusted network plane topology that is secure and resilient against potential attacks.

For example, various example embodiments for supporting stateless multicast may be configured to support relatively easy deployment of stateless multicast within various types of communication networks. For example, various example embodiments for supporting stateless multicast may be configured to support relatively easy deployment of stateless multicast based on use of a programmable network plane (e.g., processors that are protocol agnostic may be programmed to support any packet handling semantics, including those needed to support embodiments of stateless multicasting of packets). For example, various example embodiments for supporting stateless multicast may be configured to support relatively easy deployment of stateless multicast based on use of soft-switches (e.g., data center network virtualization is based on hypervisor-based soft-switches and, since such soft-switches are software-based, the soft-switches may be programmed to support embodiments of stateless multicasting of packets). As such, various example embodiments for stateless multicast support adoption of stateless multicast in existing communication networks.

For example, various example embodiments for supporting stateless multicast may be configured to support zero-trust, secure multicast. This scheme provides zero-trust, micro-segmentation security by default. It is noted that a node will be unable to directly send a packet to another node or set of nodes, since a node does not have the capability of creating the encoded multicast header, as the link numbering of each node in the network and the layout of the network is not publicly available. Hence, a node can talk to another node or set of nodes only by the intervention of the central controller, which provides the requisite encoded multicast header for each multicast flow. As the encoded header is a secret, it is similarly difficult for a third party to inject packets with arbitrary headers since, with a very high likelihood, the maliciously headers will be malformed (e.g., have pointers outside the range of the header length, refer to links which do not exist, and so forth). Additionally, the stateless scheme is secure since the multicast encoding is a complex string of bits which an arbitrary node will be unable to create and inject into the network. As such, various example embodiments for stateless multicast provide zero-trust, secure multicast.

For example, various example embodiments for supporting stateless multicast may be configured to overcome various aspects associated with forwarding of multicast packets in existing networks. For example, various example embodiments for supporting stateless multicast may be configured to obviate the need to maintain state information within the multicast-enabled network (e.g., per-node forwarding state on the multicast tree for hop-by-hop forwarding in Internet Protocol (IP) networks such as IPv4 networks and IPv6 networks, per-node forwarding state on the multicast tree in Multiprotocol Label Switching (MPLS) networks, per-node forwarding state on the multicast tree in Segment Routing (SR) based multicasting (e.g., Tree-SID state where a Tree-SID approach is used), and so forth). For example, various example embodiments for supporting stateless multicast may be configured to support scalability which may be difficult to achieve with approaches such as BIER in which bit string limits may not be able to support large, dynamic networks which may include thousands of links and in which links may be added and removed regularly.

For example, various example embodiments for supporting stateless multicast may be configured to support acceleration of and optimal management of publisher-subscriber traffic. A common traffic pattern in various types of networks (e.g., data networks, human social networks, machine networks, Internet-of-Things (IoT) networks, and so forth) is the publisher-subscriber traffic pattern in which traffic from a publisher is sent to multiple subscribers. Various example embodiments for supporting stateless multicast may be configured to support acceleration and optimal management of publisher-subscriber traffic by replacing multiple unicast copies of the traffic with a single multicast copy of each of the links to the subscribers.

It will be appreciated that various example embodiments for supporting stateless multicast may be configured to provide various advantages or potential advantages.

It will be appreciated that, although primarily presented herein with respect to supporting stateless multicasting of packets, various example embodiments presented herein also may be used for supporting stateless unicast for unicasting of packets within communication networks.

Figure 8:
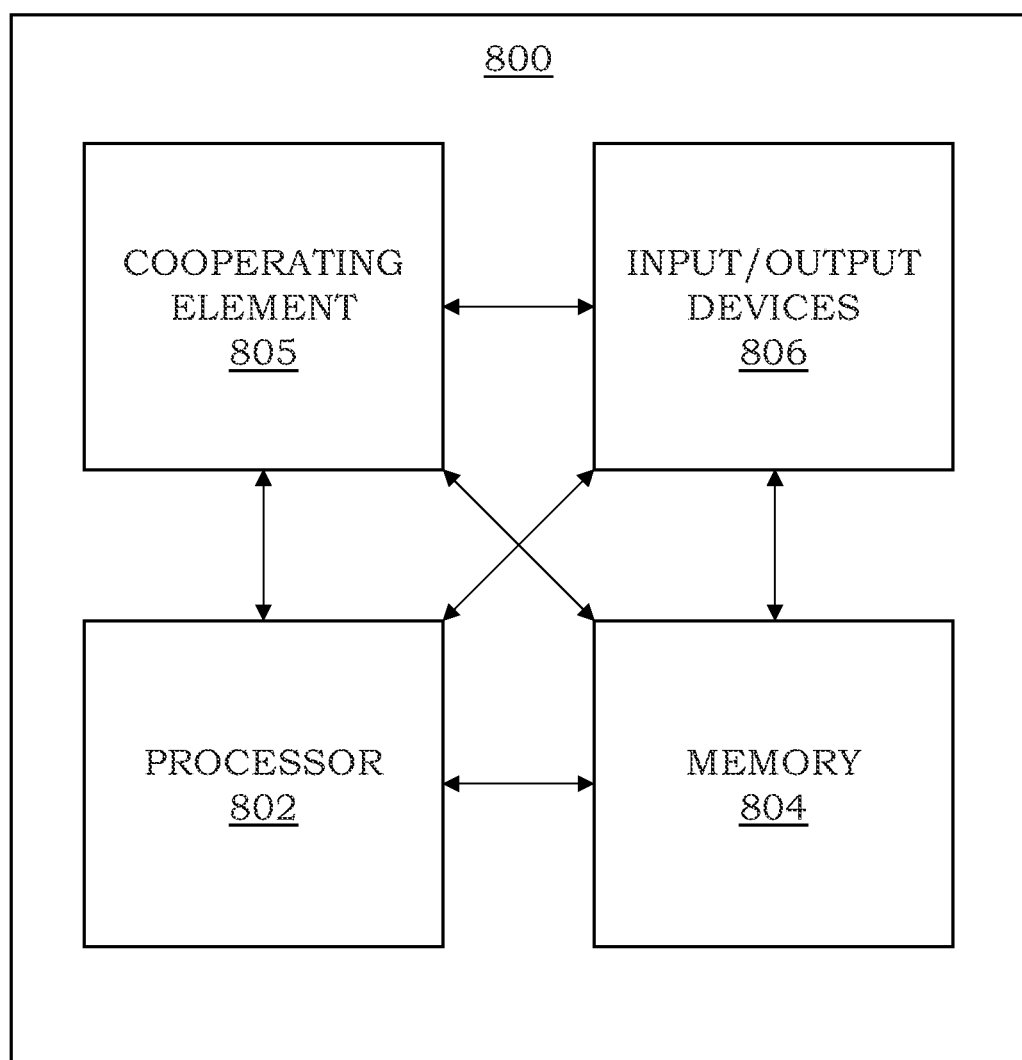
FIG. 8 depicts an example embodiment of a computer suitable for use in performing various functions presented herein.

FIG. 8 depicts an example embodiment of a computer suitable for use in performing various functions presented herein.

The computer 800 includes a processor 802 (e.g., a central processing unit (CPU), a processor, a processor having a set of processor cores, a processor core of a processor, or the like) and a memory 804 (e.g., a random access memory, a read only memory, or the like). The processor 802 and the memory 804 may be communicatively connected. In at least some example embodiments, the computer 800 may include at least one processor and at least one memory including computer program code, wherein the at least one memory and the computer program code are configured to, with the at least one processor, cause the computer to perform various functions presented herein.

The computer 800 also may include a cooperating element 805. The cooperating element 805 may be a hardware device. The cooperating element 805 may be a process or computer program code that can be loaded into the memory 804 and executed by the processor 802 to implement various functions presented herein (in which case, for example, the cooperating element 805 (including associated data structures) can be stored on a non-transitory computer-readable storage medium, such as a storage device or other suitable type of storage element (e.g., a solid state drive, a magnetic drive, an optical drive, or the like)).

The computer 800 also may include one or more input/output devices 806. The input/output devices 806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 800 may represent a general architecture and functionality suitable for implementing functional elements described herein, portions of functional elements described herein, or the like, as well as various combinations thereof. For example, computer 800 may provide a general architecture and functionality that is suitable for implementing one or more elements presented herein, such as a node or a portion thereof, a controller or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
at least one processor, and
at least one memory including instructions which, when executed by the at least one processor, cause the apparatus at least to:
receive, by a node, a packet having an encoded multicast header associated therewith, wherein the encoded multicast header includes, for a link over which the packet is to be transmitted by the node, a link tuple including a link identifier of the link and a link header configured for forwarding of the packet downstream of the link, wherein the encoded multicast header includes a pointer prepended to the link tuple, wherein the pointer is set in a manner for indicating that the link tuple is the only link tuple included in the packet for the node; and
support, by the node based on the encoded multicast header, communication of the packet over the link.

2. An apparatus, comprising:
at least one processor, and
at least one memory including instructions which, when executed by the at least one processor, cause the apparatus at least to:
receive, by a node, a packet having an encoded multicast header associated the rewith, wherein the encoded multicast header includes, for a link over which the packet is to be transmitted by the node, a link tuple including a link identifier of the link and a li nk header configured for forwarding of the packet downstream of the link, wherein the e ncoded multicast header includes a pointer prepended to the link tuple, wherein the pointer is set in a manner for indicating that the link tuple is a final link tuple of a set of link tuples included in the packet for the node; and
support, by the node based on the encoded multicast header, communication of the packet over the link.

3. The apparatus of claim 2, wherein the link tuple is encoded using a bit string having an initial portion that encodes the link identifier of the link and a remaining portion that encodes the link header configured for forwarding of the packet downstream of the link.

4. The apparatus of claim 2, wherein the link header configured for forwarding of the packet downstream of the link is configured for forwarding of the packet from a downstream node that is downstream of the link to a set of destination nodes for which the packet is intended that are reachable via the downstream node that is downstream of the link.

5. The apparatus of claim 2, wherein, to support communication of the packet over the link, the instructions, when executed by the at least one processor, cause the apparatus at least to:
    identify, by the node from the encoded multicast header, the link header configured for forwarding of the packet downstream of the link;
    associate, by the node with the packet in place of the encoded multicast header, a new encoded multicast header including the link header configured for forwarding of the packet downstream of the link; and
    transmit, by the node over the link, the packet and the new encoded multicast header associated with the packet.

6. The apparatus of claim 5, wherein, to identify the link header configured for forwarding of the packet downstream of the link, the instructions, when executed by the at least one processor, cause the apparatus at least to:
    identify, within the link tuple based on an identifier of the link known to the node, the link identifier; and
    identify, from the link tuple based on identification of the link identifier, the link header configured for forwarding of the packet downstream of the link.

7. The apparatus of claim 2, wherein the encoded multicast header includes a global pointer indicative of a location of the link tuple within the encoded multicast header, wherein, to support communication of the packet over the link, the instructions, when executed by the at least one processor, cause the apparatus at least to:
    identify, by the node from the encoded multicast header based on the global pointer, the link header configured for forwarding of the packet downstream of the link;
    update, by the node, the global pointer to point to a location of the link header configured for forwarding of the packet downstream of the link; and
    transmit, by the node over the link, the packet and the encoded multicast header associated with the packet.

8. The apparatus of claim 7, wherein, to identify the link header configured for forwarding of the packet downstream of the link, the instructions, when executed by the at least one processor, cause the apparatus at least to:
    identify, within the encoded multicast header based on the global pointer, the location of the link tuple within the encoded multicast header;
    identify, within the link tuple based on an identifier of the link known to the node, the link identifier; and
    identify, from the link tuple based on identification of the link identifier, the link header configured for forwarding of the packet downstream of the link.

9. An apparatus, comprising:
    at least one processor, and
    at least one memory including instructions which, when executed by the at least one processor, cause the apparatus at least to:
    receive, by a node, a packet having an encoded multicast header associated therewith, wherein the encoded multicast header includes, for a first link over which the packet is to be transmitted by the node, a first link tuple including a link identifier of the first link and a link header configured for forwarding of the packet downstream of the first link, wherein the encoded multicast header includes a pointer prepended to the first link tuple, wherein the pointer is set in a manner for identifying a location, within the encoded multicast header, of a second pointer associated with a second link tuple associated with a second link over which the packet is to be forwarded by the node; and
    support, by the node based on the encoded multicast header, communication of the packet over the first link.

10. The apparatus of claim 9, wherein the second link tuple includes a second link identifier of the second link and a second link header configured for forwarding of the packet downstream of the second link.

11. The apparatus of claim 9, wherein the instructions, when executed by the at least one processor, cause the apparatus at least to:
    support, by the node based on the encoded multicast header, communication of the packet over the second link.

12. An apparatus, comprising:
    at least one processor, and
    at least one memory including instructions which, when executed by the at least one processor, cause the apparatus at least to:
    receive, by a node, a packet having an encoded multicast header associated therewith, wherein the encoded multicast header includes, for a first link over which the packet is to be transmitted by the node, a first link tuple including a link identifier of the first link and a link header configured for forwarding of the packet downstream of the first link, wherein the encoded multicast header includes a first pointer prepended to the first link tuple, wherein the encoded multicast header includes a second link tuple associated with a second link over which the packet is to be forwarded by the node and a second pointer prepended to the second link tuple, wherein the first pointer prepended to the first link tuple points to the second pointer prepended to the second link tuple; and
    support, by the node based on the encoded multicast header, communication of the packet over the first link and the second link.

13. The apparatus of claim 12, wherein the encoded multicast header includes a global pointer which points to the first pointer prepended to the first link tuple.

* * * * *